US010924671B2

(12) United States Patent
Yanai et al.

(10) Patent No.: US 10,924,671 B2
(45) Date of Patent: Feb. 16, 2021

(54) IMAGING CONTROL APPARATUS WITH IMPROVED OPERABILITY IN PERFORMING CONTINUOUS IMAGE CAPTURING BY USING A SHUTTER BUTTON AND A TOUCH BAR, CONTROL METHOD THEREFOR, AND RECORDING

(71) Applicant: CANON KABUSHIKI KAISHA, Tokyo (JP)

(72) Inventors: Shotaro Yanai, Yokohama (JP); Kenji Yokoyama, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 73 days.

(21) Appl. No.: 16/175,576

(22) Filed: Oct. 30, 2018

(65) Prior Publication Data
US 2019/0141244 A1 May 9, 2019

(30) Foreign Application Priority Data
Nov. 8, 2017 (JP) ................................ 2017-215914

(51) Int. Cl.
*H04N 5/232* (2006.01)
*H04N 5/915* (2006.01)

(52) U.S. Cl.
CPC ..... *H04N 5/23245* (2013.01); *H04N 5/23216* (2013.01); *H04N 5/23232* (2013.01); *H04N 5/915* (2013.01)

(58) Field of Classification Search
CPC .......... H04N 5/23245; H04N 5/23232; H04N 5/23216; H04N 5/915
See application file for complete search history.

(56) References Cited

U.S. PATENT DOCUMENTS

| 8,817,158 B2* | 8/2014 | Saito | ..................... G06F 3/0488 |
| | | | 348/222.1 |
| 9,106,836 B2* | 8/2015 | Aoyama | ............ H04N 5/23293 |
| 9,247,141 B2* | 1/2016 | Tseng | ................. H04N 5/23216 |
| 2003/0146981 A1 | 8/2003 | Bean | |
| 2006/0181639 A1 | 8/2006 | Ueda | |

(Continued)

FOREIGN PATENT DOCUMENTS

| CN | 1256435 A | 6/2000 |
| CN | 101626500 A | 1/2010 |

(Continued)

*Primary Examiner* — Luong T Nguyen
(74) *Attorney, Agent, or Firm* — Canon U.S.A., Inc. IP Division

(57) ABSTRACT

An imaging control apparatus includes an instruction providing unit configured to be capable of providing an instruction for continuous image capturing in response to an operation on a first operation member, a touch detector configured to be capable of detecting a touch operation on a second operation member, and a control unit configured to perform control for recording images at an interval that varies, between continuous image capturing in a first image capturing period in which the second operation member is not touched, and continuous image capturing in a second image capturing period in which the second operation member is touched, during continuous image capturing that begins in response to an operation on the first operation member.

16 Claims, 9 Drawing Sheets

(56) References Cited

U.S. PATENT DOCUMENTS

| | | | |
|---|---|---|---|
| 2008/0024619 A1* | 1/2008 | Ono | H04N 5/232 |
| | | | 348/222.1 |
| 2008/0284856 A1 | 11/2008 | Okazaki | |
| 2010/0295970 A1 | 11/2010 | Suzuki | |
| 2012/0146929 A1* | 6/2012 | Oyama | H04N 5/23293 |
| | | | 345/173 |
| 2013/0100336 A1 | 4/2013 | Shintani | |
| 2015/0022706 A1 | 1/2015 | Jogetsu | |
| 2015/0195452 A1 | 7/2015 | Saito | |
| 2016/0269674 A1 | 9/2016 | Rathore | |
| 2016/0309063 A1 | 10/2016 | Choudhary | |
| 2017/0019603 A1 | 1/2017 | Kim | |

FOREIGN PATENT DOCUMENTS

| | | | |
|---|---|---|---|
| CN | 103970272 A | | 8/2014 |
| CN | 104539849 A | | 4/2015 |
| JP | 2002-148693 A | | 5/2002 |
| JP | 2010-141582 | * | 6/2010 |
| JP | 2010-141582 A | | 6/2010 |

* cited by examiner

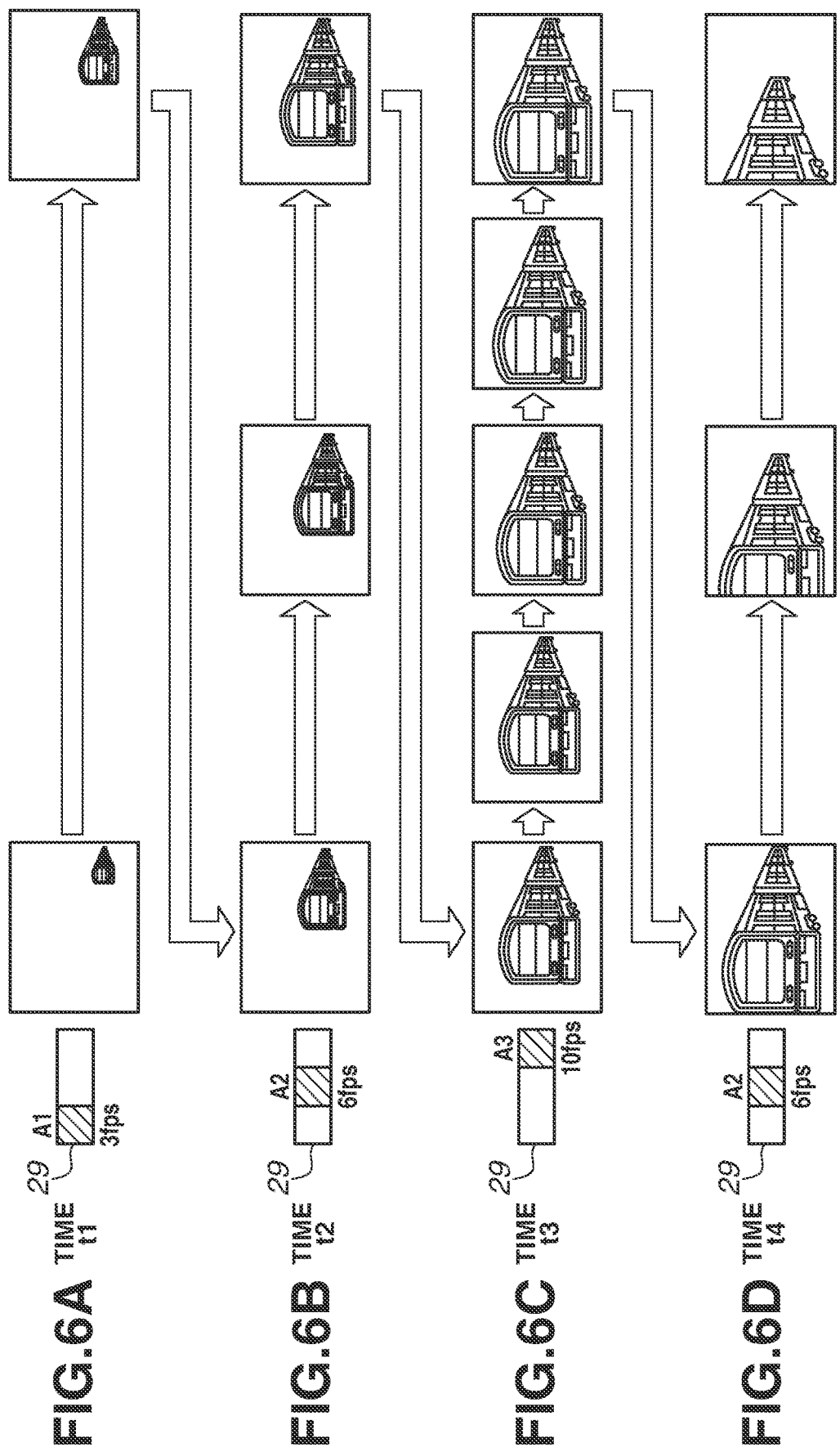

IMAGING CONTROL APPARATUS WITH IMPROVED OPERABILITY IN PERFORMING CONTINUOUS IMAGE CAPTURING BY USING A SHUTTER BUTTON AND A TOUCH BAR, CONTROL METHOD THEREFOR, AND RECORDING

BACKGROUND OF THE INVENTION

Field of the Invention

The present invention relates to an imaging control apparatus capable of controlling continuous image capturing and a control method for the imaging control apparatus.

Description of the Related Art

There are methods for changing continuous image capturing velocity in performing continuous image capturing (continuous photographing). In Japanese Patent Application Laid-Open No. 2002-148693, a related method is discussed as follows. First, a release button is pressed to cause electrode contact. According to the magnitude of an electric potential detected by the electrode contact, operation such as light metering, ranging, and image capturing are performed. When the release button is further pressed, a continuous image capturing velocity is changed according to how the release button is pressed. Japanese Patent Application Laid-Open No. 2010-141582 discusses a method for allowing a time interval of continuous image capturing to be set by a touch operation before the continuous image capturing.

In the method of Japanese Patent Application Laid-Open No. 2002-148693, the continuous image capturing velocity is changed according to how the release button is pressed. Accordingly, for example, in a case where it is difficult for a user to maintain a press amount, such as when the user performs image capturing while panning a camera or when the user concentrates on an object, the continuous image capturing velocity may be unintentionally changed.

According to the method of Japanese Patent Application Laid-Open No. 2010-141582, there may be a case where the velocity of the continuous image capturing cannot be changed depending on the situation of an object during image capturing. In such a case, the image capturing may be excessively performed, or the image capturing may not be performed at intended timing.

SUMMARY OF THE INVENTION

In view of the foregoing issues, the present invention is directed to providing an imaging control apparatus with improved operability in performing continuous image capturing.

According to an aspect of the present invention, an imaging control apparatus includes an instruction providing unit configured to be capable of providing an instruction for continuous image capturing in response to an operation on a first operation member, a touch detector configured to be capable of detecting a touch operation on a second operation member, and a memory and at least one processor and/or at least one circuit to perform the operations of the following unit, a control unit configured to perform control for recording images at an interval that varies, between continuous image capturing in a first image capturing period in which the second operation member is not touched, and continuous image capturing in a second image capturing period in which the second operation member is touched, during continuous image capturing that begins in response to an operation on the first operation member.

Further features of the present invention will become apparent from the following description of exemplary embodiments with reference to the attached drawings.

BRIEF DESCRIPTION OF THE DRAWINGS

FIGS. 6A to 6D illustrate an example of a manner of changing a continuous image capturing velocity according to the present exemplary embodiment.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Figure 1A:
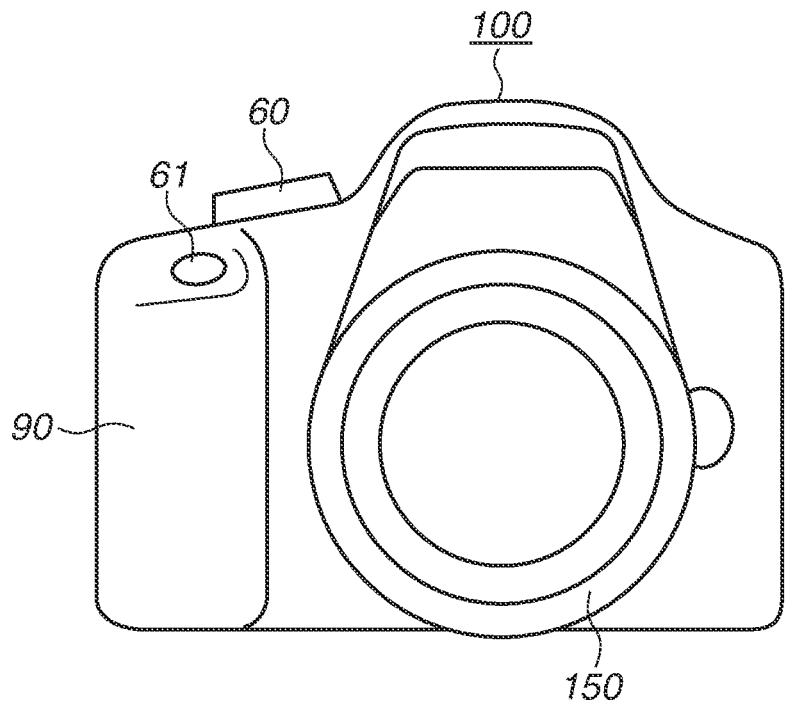
FIGS. 1A and 1B each illustrate an external view of a digital camera serving as an example of an apparatus to which a configuration according to an exemplary embodiment is applicable.
Figure 1B:
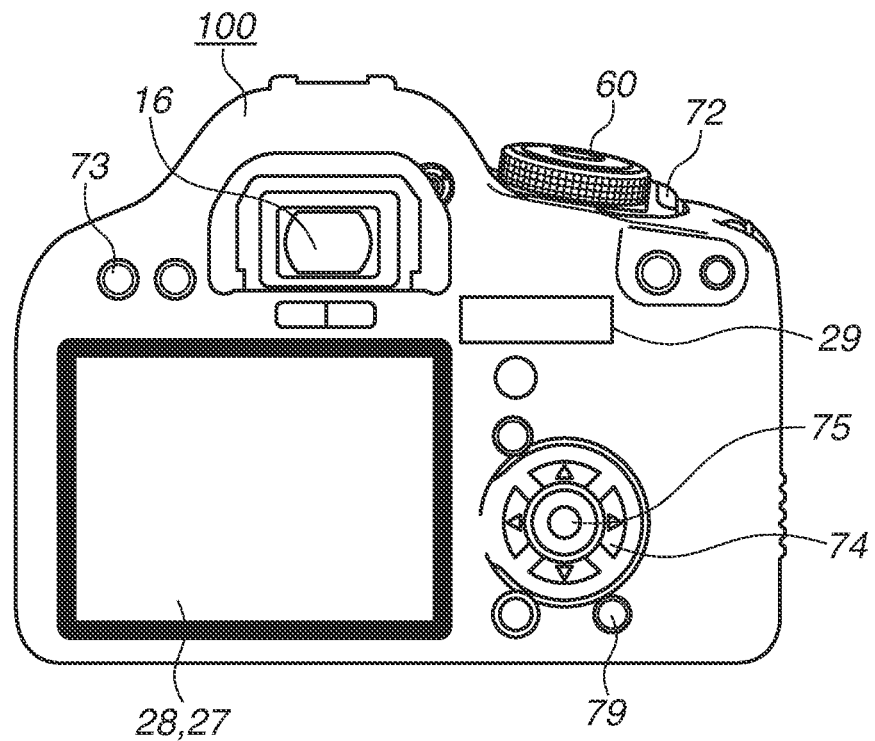

FIGS. 1A and 1B each illustrate an external view of a digital camera 100 serving as an exemplary embodiment of an imaging control apparatus to which the present invention is applicable. FIG. 1A is a front perspective view of the digital camera 100, and FIG. 1B is a back perspective view of the digital camera 100. In FIG. 1A, a display unit 28 is a display portion for displaying images and various kinds of information. A lens unit 150 is a lens unit including a lens. A shutter button 61 is an operation unit for providing an image capturing instruction. A mode selection switch 60 is an operation unit for selecting any of various modes. A power switch 72 is an operation member for switching between power-on and power-off of the digital camera 100. A cross key 74 is a four-direction key having pressable upper, lower, left, and right portions. It is possible to perform an operation corresponding to the pressed portion of the cross key 74. A SET button 75 is a push button to be mainly used for determining a selection item. A playback button 79 is an operation button for switching between an image capturing mode and a playback mode. Pressing the playback button 79 in the image capturing mode effects a transition to the playback mode, and can thereby cause the display unit 28 to display the latest image among images recorded in a recording medium 200. A MENU button 73 is included in an operation unit 70. The MENU button 73 is provided to display setting items and settings on the display unit 28 when a user performs various kinds of setting of the digital camera 100. In a menu screen, the user can perform time setting and display setting, as well as setting related to communication, and setting of a continuous image capturing velocity (a continuous photographing velocity, and an interval for performing continuous image capturing).

A touch bar 29 is an operation member provided separately from the shutter button 61, and is disposed at a position where the touch bar 29 can be operated even in a state where the shutter button 61 is pressed. The user can grasp a grip portion 90 for holding a camera, with the middle, ring, and little fingers as well as the palm of a hand. Further, the user can place the forefinger on the shutter button 61, and position the thumb at the touch bar 29. In other words, the shutter button 61 is provided at a location that allows the user to operate the shutter button 61 with the forefinger of the right hand of the user holding the grip portion 90. The touch bar 29 is provided at a location that allows the user to perform a touch operation with the thumb of the right hand holding the grip portion 90, while looking through a viewfinder 16. The touch bar 29 is provided on the back face of the digital camera 100. The back face of the digital camera 100 is a face opposite to the imaging direction. Specifically, the touch bar 29 is provided at a position toward the right side of the viewfinder 16 and toward the left side of the grip portion 90. To be more specific, in terms of the vertical direction (a direction perpendicular to the right direction), the touch bar 29 is provided in a direction toward the viewfinder 16 with respect to the center of the back face of the digital camera 100 (i.e., on the upper side). The touch bar 29 is a device different from the display unit 28, and is disposed at a position higher than the display unit 28 on the back face of the digital camera 100.

The operation unit 70 includes the shutter button 61, the power switch 72, the cross key 74, the SET button 75, the playback button 79, the touch bar 29, and the MENU button 73.

The viewfinder 16 is a looking-through-type viewfinder, for confirming a focus and a composition of an object image obtained through the lens unit 150, by observing a display unit (not illustrated) within the viewfinder 16.

Figure 2:
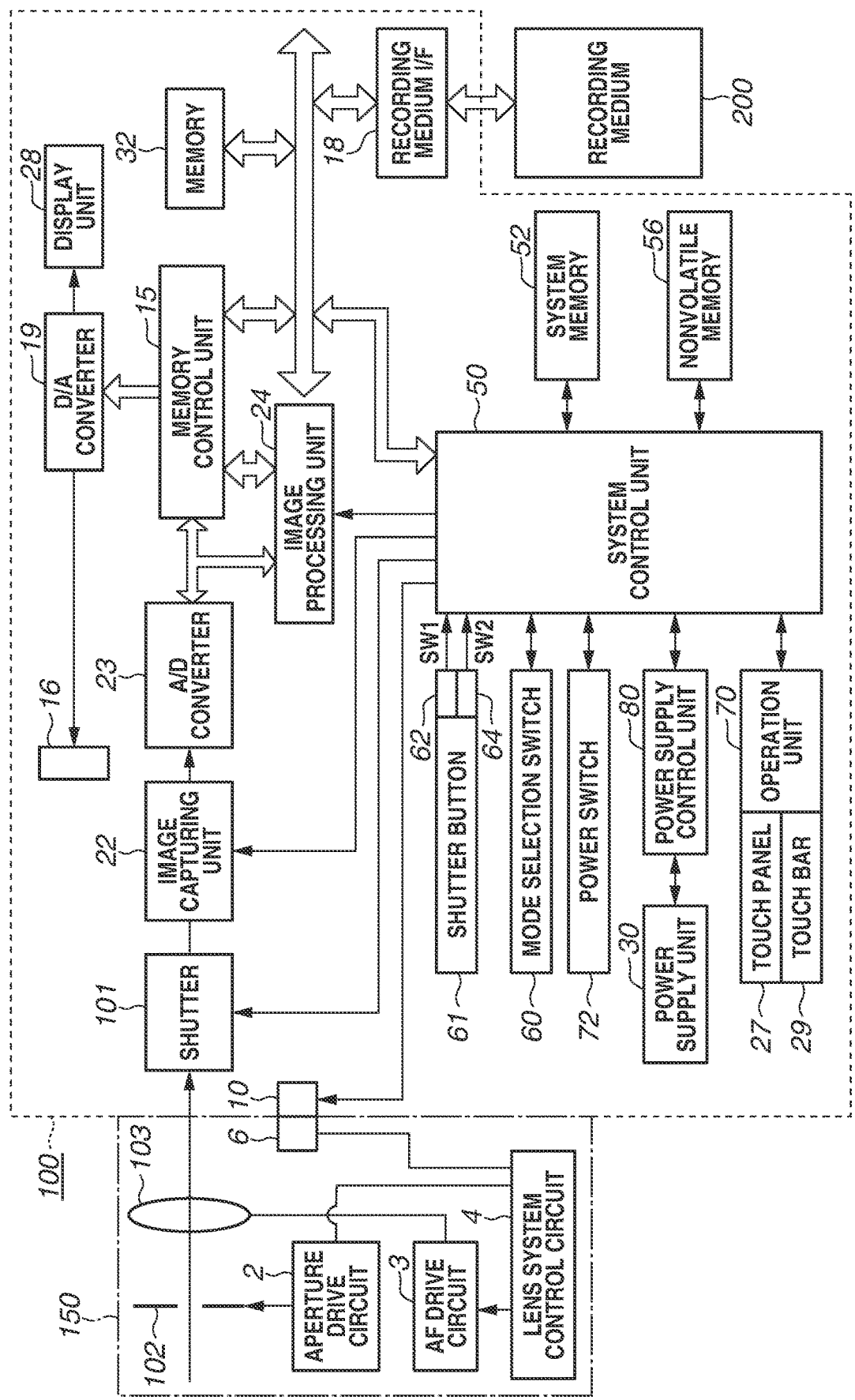
FIG. 2 is a block diagram illustrating a configuration example of the digital camera serving as the example of the apparatus to which the configuration according to the present exemplary embodiment is applicable.

FIG. 2 is a block diagram illustrating a configuration example of the digital camera 100 according to the present exemplary embodiment. The lens unit 150 is equipped with a replaceable image capturing lens. A lens 103 is typically configured of a plurality lenses, but here, only one lens is illustrated for simplification. A communication terminal 6 is provided for the lens unit 150 to communicate with the digital camera 100. A communication terminal 10 is provided for the digital camera 100 to communicate with the lens unit 150. The lens unit 150 communicates with a system control unit 50 via the communication terminals 6 and 10. The lens unit 150 obtains focusing, by controlling an aperture 102 via an aperture drive circuit 2, and displacing the position of the lens 103 via an autofocus (AF) drive circuit 3, by using a lens system control circuit 4 provided inside.

A shutter 101 is a focal plane shutter capable of freely controlling the exposure period of an image capturing unit 22 based on control by the system control unit 50.

The image capturing unit 22 is an imaging sensor configured of a sensor such as a charge-coupled device (CCD) sensor or complementary metal oxide semiconductor (CMOS) sensor for converting an optical image into an electrical signal. An analog-to-digital (A/D) converter 23 converts an analog signal into a digital signal. The A/D converter 23 is used to convert an analog signal output from the image capturing unit 22 into a digital signal.

An image processing unit 24 performs predetermined pixel interpolation, resizing processing such as reduction, and color conversion processing, for data from the A/D converter 23 or data from a memory control unit 15. Further, in the image processing unit 24, predetermined calculation processing is performed using the image data obtained by imaging, and the system control unit 50 performs exposure control and ranging control based on the obtained calculation result. Autofocus (AF) processing, autoexposure (AE) processing, and electronic flash (EF) pre-emission processing in a through-the-lens (TTL) method are thereby performed. Further, in the image processing unit 24, predetermined calculation processing is also performed using the image data obtained by imaging, and automatic white balance (AWB) processing in the TTL method is also performed based on the obtained calculation result.

Output data from the A/D converter 23 is written into a memory 32 via the image processing unit 24 and the memory control unit 15, or directly written into the memory 32 via the memory control unit 15 without going through the image processing unit 24. The memory 32 stores image data obtained by the image capturing unit 22 and then converted into digital data by the A/D converter 23, and stores image data to be displayed by the display unit 28.

The memory 32 has a storage capacity sufficient to store a predetermined number of still images, a moving image, and sound of a predetermined length of time. The memory 32 also serves as a memory (video memory) for image display. A digital-to-analog (D/A) converter 19 converts data for image display stored in the memory 32 into an analog signal, and supplies the analog signal to the display unit 28. In this way, the image data for display written in the memory 32 is displayed by the display unit 28 via the D/A converter 19.

The display unit 28 performs display according to the analog signal from the D/A converter 19, on a display device such as a liquid crystal display (LCD). The digital signals resulting from the A/D conversion by the A/D converter 23 are accumulated in the memory 32, and the accumulated digital signals are converted into the analog signals by the D/A converter 19. These analog signals are then sequentially transferred to the display unit 28 and the display unit within the viewfinder 16 to be displayed. Such sequential transfer and display enables the display unit 28 to function as an electronic viewfinder and thus to perform through-image display (live view display).

A nonvolatile memory 56 is a memory provided as a recording medium that is electrically erasable, recordable, and readable by the system control unit 50. For example, an electrically erasable programmable read only memory (EEPROM) is used. The nonvolatile memory 56 stores a constant for operation of the system control unit 50, and a program. The program here refers to a computer program for executing various flowcharts to be described below in the present exemplary embodiment.

The system control unit 50 includes at least one processor and/or at least one circuit, and controls the entire digital camera 100. The system control unit 50 implements each process of the present exemplary embodiment, by executing the program recorded in the nonvolatile memory 56 described above. A random access memory (RAM) is used for a system memory 52. A constant for operation of the system control unit 50, a variable, and a program read out from the nonvolatile memory 56 are loaded into the system memory 52. The system control unit 50 also performs display control by controlling components such as the memory 32, the D/A converter 19, and the display unit 28.

The mode selection switch 60, the shutter button 61, and the operation unit 70 are operation units for inputting various operation instructions into the system control unit 50. The mode selection switch 60 changes the operation mode of the system control unit 50 to any of modes including a still-image recording mode, a moving image capturing mode, and the playback mode. The still-image recording mode includes a continuous image capturing mode, an automatic image capturing mode, an automatic scene determination mode, a manual mode, and various scene modes for providing image capturing settings by image capturing scene, a program AE mode, and a custom mode. Using the mode selection switch 60, the user can directly switch to any one of these modes included in the menu screen. Alternatively, the user may switch to the menu screen with the mode selection switch 60 and then switch to any one of these modes included in the menu screen by using other operation member. Similarly, the moving image capturing mode may include a plurality of modes.

A first shutter switch 62 is turned on during an operation on the shutter button 61 provided in the digital camera 100, at a half press (an image capturing preparation instruction), and thereby generates a first shutter switch signal SW1. The first shutter switch signal SW1 starts operation such as the AF processing, the AE processing, the AWB processing, and the EF pre-flash processing. A second shutter switch 64 is turned on at the completion of the operation on the shutter button 61, at a full press (an image capturing instruction), and thereby generates a second shutter switch signal SW2. Based on the second shutter switch signal SW2, the system control unit 50 starts still-image imaging operation by the image capturing unit 22, i.e., operation of a series of image capturing processes from signal readout from the image capturing unit 22 to writing of image data into the recording medium 200.

Functions are appropriately assigned to the operation members of the operation unit 70 for each scene by selecting various function icons displayed by the display unit 28. The operation members thereby act as various function buttons. The operation unit 70 includes the function buttons, a touch panel 27, and the touch bar 29, and receives a touch operation on a touch detection surface. The touch operation will be described below. The function buttons include an end button, a back button, an image feeding button, a jump button, a narrowing-down button, and an attribute change button. For example, when the MENU button 73 is pressed, the menu screen in which various kinds of setting can be performed is displayed by the display unit 28. The user can perform various kinds of setting by intuitively using the menu screen displayed by the display unit 28, the cross key 74, and the SET button 75.

A power supply control unit 80 includes a battery detecting circuit, a DC-DC converter, and a switch circuit for changing a block to be energized. The power supply control unit 80 thereby detects the presence or absence of the attachment of a battery, the type of a battery, and a remaining battery level. Based on the detection results and an instruction of the system control unit 50, the power supply control unit 80 controls the DC-DC converter, thereby supplying a necessary voltage for a necessary period to each of components including the recording medium 200.

A power supply unit 30 is configured of a primary battery such as an alkaline cell or a lithium battery, or a secondary battery such as a NiCd battery, a NiMH battery, or a Li battery, or an AC adapter.

A recording medium interface (I/F) 18 is an interface with the recording medium 200 such as a memory card or a hard disk. The recording medium 200 is a nonvolatile recording medium such as a memory card for recording an image in image capturing. The recording medium 200 includes a semiconductor memory, an optical disk, or a magnetic disk.

The touch bar 29 and the touch panel 27 included in the operation unit 70 will be described. The touch panel 27 is a touch panel capable of detecting a touch on the display unit 28. The touch panel 27 and the display unit 28 can be integrally configured. For example, the touch panel 27 is configured to have light transmittance not disturbing display of the display unit 28, and is attached to an upper layer of the display screen of the display unit 28. Subsequently, input coordinates in the touch panel and display coordinates on the display unit 28 are brought into correspondence with each other. This can form a graphical user interface (GUI) that allows the user to perform an operation as if the user is directly operating a screen displayed on the display unit 28. The system control unit 50 can detect the following operations on the touch panel 27 and the touch bar 29 or states of the touch panel 27 and the touch bar 29. In the example in FIG. 1A, FIG. 1B, and FIG. 2, the touch bar 29 is not integral with the display screen, but may be integral with the display screen.

A new touch of a finger or stylus pen on the touch surface, a touch which did not exist prior to this time. In other words, the start of a touch (hereinafter referred to as "Touch-Down").

A state where a finger or stylus pen touching the touch surface (hereinafter referred to as "Touch-On").

A motion of a finger or stylus pen touching the touch surface (hereinafter referred to as "Touch-Move").

A release of a finger or stylus pen touching the touch surface from the touch surface. In other words, the termination of a touch (hereinafter referred to as "Touch-Up").

A state where nothing touches the touch surface (hereinafter referred to as "Touch-Off").

When Touch-Down is detected, Touch-On is detected at the same time. After Touch-Down, unless Touch-Up is detected, the detection of Touch-On normally continues. Touch-Move being detected is also a state where Touch-On is detected. Even if Touch-On is detected, Touch-Move is not detected if a touch position has not moved. Upon detection of Touch-Up of all touching fingers or a touching stylus pen, Touch-Off is established.

Information about these operations and states as well as the position coordinates of a finger or stylus pen touching the touch surface is notified to the system control unit 50 through an internal bus, and the system control unit 50 determines what kind of operation is performed on the touch surface based on the notified information. As for Touch-Move, a moving direction of a finger or stylus pen moving on the touch panel can also be determined with respect to each of a vertical component and a horizontal component on the touch panel 27 as well as a horizontal component of the touch bar 29, based on a change of the position coordinates. Further, when Touch-Up is performed after a certain amount of Touch-Move from Touch-Down on the touch surface, this operation can be regarded as drawing of a stroke. An operation of quickly drawing the stroke is referred to as a flick. The flick is such an operation that a finger is quickly moved by some distance while touching the touch surface, and then leaves. In other words, the flick is an operation of quickly running on the touch surface with a finger as if flipping. When Touch-Up is detected immediately after Touch-Move performed for a predetermined distance or more at a predetermined velocity or more is detected, it can be determined that the flick has been performed. Further, in a case where Touch-Move performed for the predetermined distance or more at less than the predetermined velocity is detected, it is determined that a drag has been performed. For the touch panel 27 and the touch bar 29, any of various types may be used, including a resistance film type, a capacitive sensing type, a surface acoustic wave type, an infrared ray type, an electromagnetic induction type, an image recognition type, and an optical sensor type. Depending on the type, a touch is detected by an approach of a finger or stylus pen to the touch panel 27 or the touch bar 29, or detected by contact of a finger or stylus pen with the touch panel 27 or the touch bar 29, and either method may be adopted.

Figure 3:
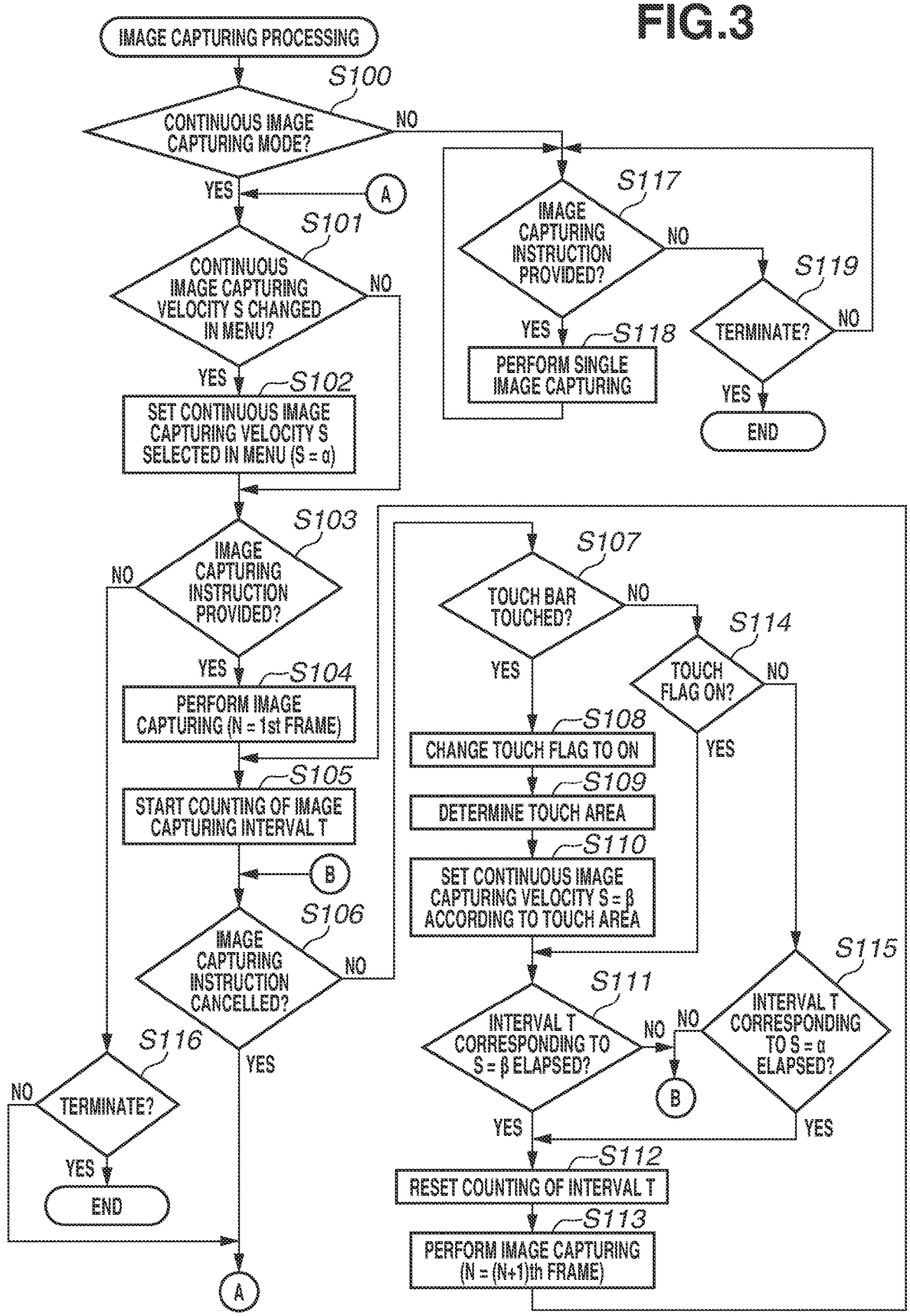
FIG. 3 is a flowchart illustrating image capturing processing according to the present exemplary embodiment.

Next, image capturing processing of the present exemplary embodiment will be described with reference to FIG. 3. The system control unit 50 executes the program recorded in the nonvolatile memory 56 by loading the program into the system memory 52, thereby implementing this processing. This processing starts when the digital camera 100 is powered on and the image capturing mode begins.

In step S100, the system control unit 50 determines whether the current image capturing mode is the continuous image capturing mode. If the system control unit 50 determines that the current image capturing mode is the continuous image capturing mode (YES in step S100), the processing proceeds to step S101. If not (NO in step S100), the processing proceeds to step S117.

In step S101, the system control unit 50 determines whether a continuous image capturing velocity S is changed in a menu screen about image capturing. The menu screen about image capturing can be displayed by pressing the MENU button 73. The continuous image capturing velocity S can be selected from 30 fps, 20 fps, and 10 fps. If the system control unit 50 determines that an operation for changing the continuous image capturing velocity S has been performed (YES in step S101), the processing proceeds to step S102. If not (NO in step S101), the processing proceeds to step S103.

In step S102, the system control unit 50 sets the continuous image capturing velocity S selected in the menu screen as S=α, and records this setting into the system memory 52. An interval T between frames in the continuous image capturing is calculated according to the set continuous image capturing velocity S. The interval T is longer as the value of the continuous image capturing velocity S is smaller, and the interval T is shorter as the value of the continuous image capturing velocity S is larger. In a case where the continuous image capturing velocity S is not changed by the user in the menu screen, 10 fps is set for S=α, as an initial setting.

In step S103, the system control unit 50 determines whether an image capturing instruction is provided. The image capturing instruction can be provided by pressing the shutter button 61. If the system control unit 50 determines that the image capturing instruction is provided (YES in step S103), the processing proceeds to step S104. If not (NO in step S103), the processing proceeds to step S116.

In step S104, the system control unit 50 performs image capturing of an image capturing frame number N=1 in the continuous image capturing. The image capturing of one frame (=1 frame) is a flow illustrated in FIG. 5A. First, an AE sensor performs light metering, and the image capturing unit 22 performs exposure. Output signals of the respective pixels are sequentially read out, and then each converted into a digital signal by the A/D converter 23. Further, the image processing unit 24 performs image processing on output data of each pixel resulting from the digital conversion, and image data generated by this image processing is stored into the memory 32. The processing up to this point is the image capturing of one frame. The image data stored in the memory 32 is then stored into the recording medium 200.

In step S105, upon completion of the processing for the image capturing of one frame, the system control unit 50 starts counting the interval T until start of the next image capturing.

In step S106, the system control unit 50 determines whether the image capturing instruction is cancelled. If the shutter button 61 not being pressed is detected (YES in step S106), the processing returns to step S101. If the shutter button 61 is being pressed, the system control unit 50 determines that the user continues the image capturing (NO in step S106), and the processing proceeds to step S107.

In step S107, the system control unit 50 determines whether the touch bar 29 has been touched. In a case where the user touches the touch bar 29 with a finger, the touch is detected. If the system control unit 50 determines that the touch bar 29 has been touched (YES in step S107), the processing proceeds to step S108. If not (NO in step S107), the processing proceeds to step S114.

In step S108, the system control unit 50 changes a touch flag stored in the system memory 52 to NO, and records the touched state of the touch bar 29. The touch flag is a flag for indicating whether the touch bar 29 has been touched after the start of the continuous image capturing.

Figure 4A:
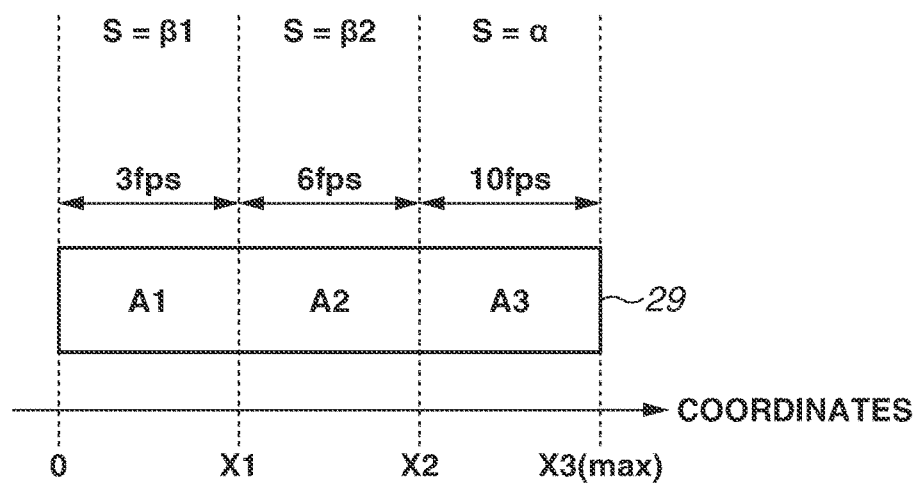
FIGS. 4A and 4B illustrate a relationship between a touch bar and a continuous image capturing velocity according to the present exemplary embodiment.

In step S109, the system control unit 50 determines which area of the touch bar 29 is touched by the user. FIG. 4A illustrates an example of a relationship between an area of the touch bar 29 and the continuous image capturing velocity S. In FIG. 4A, the touch bar 29 is divided into three areas and the continuous image capturing velocity S is assigned to each of the areas. In step S109, the system control unit 50 determines which area among these areas is touched. The number of the areas is not limited to three. The three areas, which are a range of 0 to X1, a range of X1 to X2, and a range of X2 to X3 of coordinates of the touch bar 29, are provided as areas A1, A2, and A3, respectively. The continuous image capturing velocities S assigned to the respective areas are velocities β1, β2, and β3.

Figure 4B:
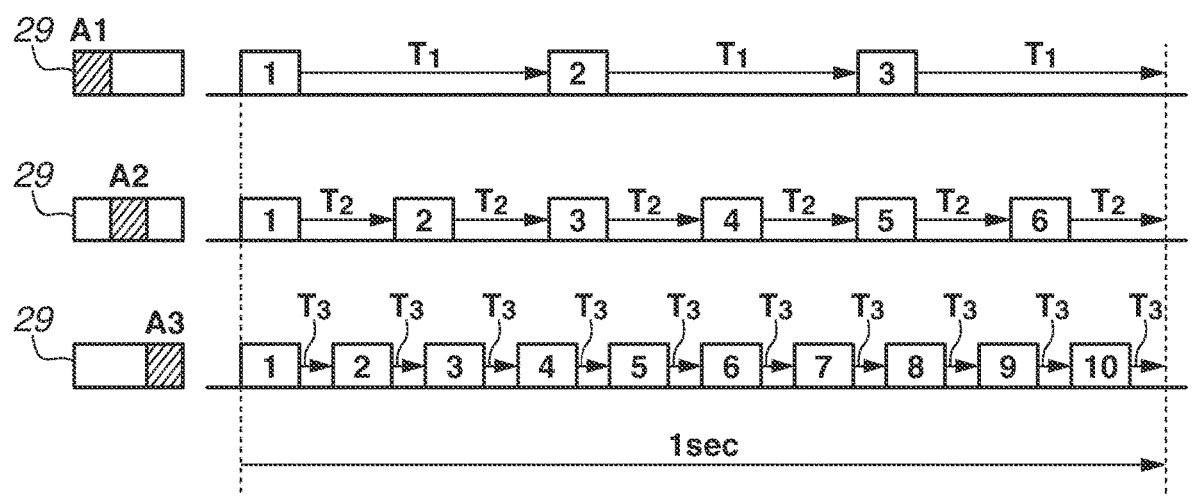

In step S110, the system control unit 50 sets the continuous image capturing velocity S=β according to the touch area acquired in step S109. The value of this β is a value equal to or less than the continuous image capturing velocity S=α set in step S101. Among the areas illustrated in FIG. 4A, the continuous image capturing velocity S=β3 in the rightmost area A3 is α set in the menu screen. In a case where the continuous image capturing velocity S=10 fps is set in the menu screen, for example, β3=10 fps, β2=6 fps, and β1=3 fps are assigned. In this way, for each of the areas of the touch bar 29, the continuous image capturing velocity S is set such that the rightmost area corresponds to the value set in the menu screen, and the continuous image capturing velocity S is lower for the area positioned leftward. FIG. 4B illustrates a continuous image capturing image at each of the continuous image capturing velocities S=β1, β2, and β3 (=α) illustrated in FIG. 4A. When the continuous image capturing velocity S is changed, the interval between image captures is changed. In a case where the intervals at the respective continuous image capturing velocities S=β1, β2, and β3 are T1, T2, and T3, a relation of T1>T2>T3 is established, i.e., the interval is shorter as the continuous image capturing velocity S is higher. If the touched area is the area A1, the continuous image capturing velocity can be reduced. Therefore, for example, in a case where there is almost no motion of an object, or in a case where there is no change in image even if the image capturing is performed many times because an object is small, it is possible to prevent storage of unnecessary data into the recording medium 200 due to excessive image capturing. On the other hand, for example, when an object quickly moves, or it is desirable to perform image capturing many times because an object is nearby, it is more unlikely to miss a photo opportunity by touching the area A3. In this way, because the continuous image capturing velocity S can be changed according to the touched area, the user can perform the continuous image capturing with flexibility and easy operability according to the state of an object during the continuous image capturing. In addition, because the touch bar 29 capable of detecting a light press is used as an operation member for setting the continuous image capturing velocity S, less vibration is generated than during an operation on a button. Therefore, occurrence of camera shake during an operation is reduced. The touch bar 29 is disposed on the back face, not the top face, of the digital camera 100, and thus the optical axis of the lens deviates less easily when a touch operation is made.

In step S111, the system control unit 50 determines whether the interval T has elapsed by a time period $T\beta$ determined according to the value of the continuous image capturing velocity $S=\beta$ set in step S110. If the interval T has elapsed by the time period $T\beta$ (YES in step S111), the processing proceeds to step S112. If not (NO in step S111), the processing returns to step S106 to determine whether the image capturing instruction is cancelled.

In step S112, because the interval T has elapsed by the predetermined time period, the system control unit 50 resets the counting.

Figure 5A:
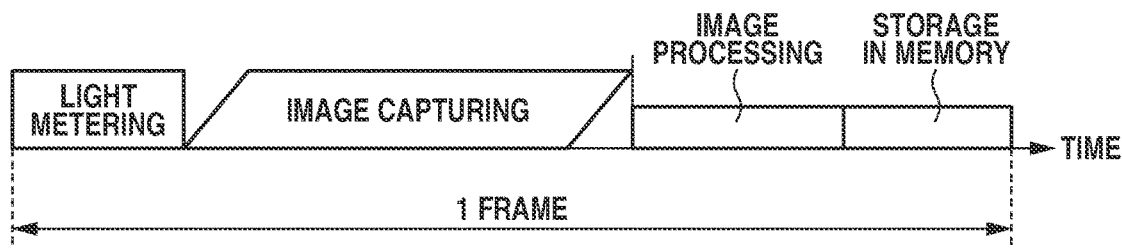
FIGS. 5A to 5C illustrate an example of continuous image capturing according to the present exemplary embodiment.

In step S113, image capturing of an image capturing frame number N+1 is performed. Similar to step S104, the content of this image capturing is as illustrated in FIG. 5A. When the image capturing is completed, the processing returns to step S105 and the counting of the interval T starts again.

In step S114, the system control unit 50 determines whether the touch flag in the system memory 52 is ON. If the touch flag is ON (YES in step S114), the processing proceeds to step S111 to determine whether the interval T has elapsed. If the touch flag is OFF (NO in step S114), the processing proceeds to step S115. Because it is determined that the touch bar 29 is not touched in step S107 and determined that the touch flag is ON in step S114, it is apparent that a touch operation was performed on the touch bar 29 during the current continuous image capturing and then the touch of the touch bar 29 was released. In other words, the continuous image capturing velocity S has been changed from $S=\alpha$ set in the menu screen to $\beta$, by the touch operation on the touch bar 29. In such a case, the continuous image capturing velocity S set according to the touch position immediately before the release of the touch from the touch bar 29 is maintained even after the release of the touch from the touch bar 29.

In step S115, the system control unit 50 determines whether the interval T has elapsed by a time period $T\alpha$ corresponding to the value of the continuous image capturing velocity $S=\alpha$ set in the menu screen. If the interval T has elapsed by the time period $T\alpha$ (YES in step S115), the processing proceeds to step S112. If the interval T has not elapsed by the time period $T\alpha$ (NO in step S115), the processing returns to step S106 to determine whether the image capturing instruction is cancelled. Because it is determined that the touch bar 29 is not touched in step S107 and determined that the touch flag is OFF in step S114, it is apparent that a change in the continuous image capturing velocity S by an operation on the touch bar 29 has never occurred after the start of the continuous image capturing. Therefore, the image capturing is performed at the velocity set as the continuous image capturing velocity S by the user in the menu screen (or the velocity of the initial setting). In this way, in a case where no specific touch operation is performed on the touch bar 29 by the user, the image capturing is performed without a decrease in the image capturing velocity from the velocity $S=\alpha$ set in the menu screen. This prevents the user from unintentionally missing a photo opportunity.

In step S116, the system control unit 50 determines whether an operation for terminating the image capturing mode is performed. For example, when a transition occurs from the image capturing mode to the playback mode, or when the power is turned off, the image capturing mode is terminated. If the system control unit 50 determines that an operation for terminating the image capturing mode is performed (YES in step S116), the image capturing processing is terminated. If not (NO in step S116), the processing returns to step S101.

Step S117 to step S119 indicate processing in a mode other than the continuous image capturing mode. Examples of the mode other than the continuous image capturing mode include a normal mode for single image capturing for capturing one frame regardless of the pressing time of the shutter button 61, and the moving image capturing mode.

In step S117, in a manner similar to step S103, the system control unit 50 determines whether an image capturing instruction is provided. If the system control unit 50 determines that an image capturing instruction is provided (YES in step S117), the processing proceeds to step S118. If not (NO in step S117), the processing proceeds to step S119.

In step S118, the system control unit 50 performs image capturing once (one frame) (single image capturing). An image capturing method is similar to the method described with reference to step S104. After performing the image capturing once, the shutter button 61 is released from the pressed state, and when the shutter button 61 is pressed again, image capturing is performed. In a case of the moving image mode, recording of a moving image starts in response to an image capturing start instruction, and the recording of the moving image stops in response to an image capturing termination instruction.

In step S119, the system control unit 50 determines whether an operation for terminating the image capturing mode is performed, as in step S116. If the system control unit 50 determines that an operation for terminating the image capturing mode is performed (YES in step S119), the image capturing processing is terminated. If not (NO in step S119), the processing returns to step S117.

Next, the image capturing processing illustrated in FIG. 3 will be described with reference to FIGS. 5B and 5C.

Figure 5B:
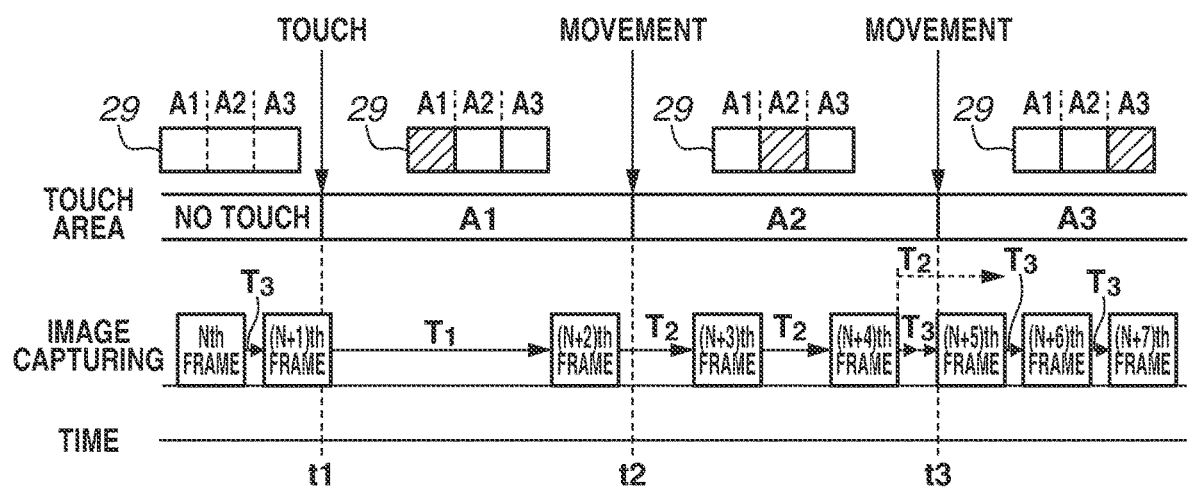

FIG. 5B illustrates a transition from a state where the touch bar 29 is not touched by the user to a state where the area A1 is touched and subsequently the touch position is moved from the area A2 to the area A3, in the division areas of the touch bar 29 illustrated in FIG. 4A. This is an example of a continuous image capturing timing chart of a case where the continuous image capturing velocity S is increased by thus moving the touch position. In FIG. 5B, a state from continuous image capturing start to image capturing of the (N+1)th frame is the state where the touch bar 29 is not touched. After the continuous image capturing start, the image capturing is performed at the continuous image capturing velocity S=α (the setting in the menu screen or the initial value), in the state where the touch bar 29 is not touched. Because S=α is 10 fps assigned to the area A3 of the touch bar 29, the continuous image capturing is performed using T3, which is a value corresponding to the continuous image capturing velocity of 10 fps, as the interval T. Assume that at a time t1 during the image capturing of the (N+1)th frame, the user performs an operation for changing the continuous image capturing velocity S from 10 fps to 3 fps by touching the area A1 of the touch bar 29 with a finger. In this case, image capturing of a (N+2)th frame is performed after the interval T1 corresponding to 3 fps elapses from the image capturing of the (N+1)th frame. Next, assume that after the image capturing of the (N+2)th frame, the user performs an operation for changing the continuous image capturing velocity S from 3 fps to 6 fps by moving the finger on the touch bar 29 to the area A2 at a time t2 before the interval T1 elapses. The time t2 comes before the interval T2 corresponding to the continuous image capturing velocity S=6 fps elapses from the image capturing of the (N+2)th frame. Therefore, image capturing of an (N+3)th frame is performed after the interval T2 elapses from the image capturing of the (N+2)th frame. The image capturing of the (N+3)th frame to image capturing of a (N+4)th frame are performed at the interval T2, without a change in the touch area, and with the continuous image capturing velocity S=6 fps remaining unchanged. Assume that after the image capturing of the (N+4)th frame, at a time t3 before the interval T2 elapses, the user performs an operation for changing the continuous image capturing velocity S from 6 fps to 10 fps by moving the finger on the touch bar 29 to the area A3. At this moment, the interval is changed to T3 corresponding to 10 fps, but the time t3 is the time that comes after a time period equal to or more than the interval T3 elapses from the image capturing of the (N+4)th frame. In this case, image capturing of an (N+5)th frame is performed immediately after the change in the touch area at the time t3 is determined. In this way, in a case where an operation for making a change to increase the continuous image capturing velocity is performed, the interval before the change is being counted, but the next image capturing is performed at the time when the change operation is performed, even if the interval has not elapsed. At the time when the change operation is performed, the user desires to have a continuous image capturing velocity higher than before the change. Therefore, the next image capturing is performed as soon as possible, so that the image capturing intended by the user can be performed.

Figure 5C:
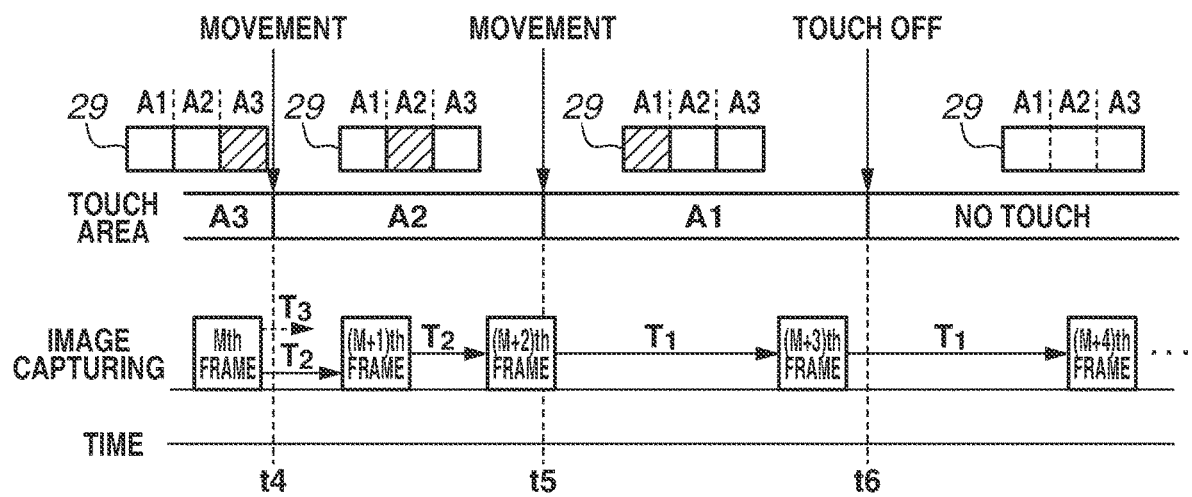

FIG. 5C illustrates an example of a continuous image capturing timing chart of a case where the user performs an operation for decreasing the continuous image capturing velocity S, by moving a finger touching the area A3 of the touch bar 29 to the area A2 and then to the area A1. The continuous image capturing up to an Mth frame is performed with the interval T3 corresponding to the continuous image capturing velocity S=10 fps assigned to the touch area A3. Assume that after the image capturing of the Mth frame, the user moves the touch area on the touch bar 29 to the area A2 before the interval T3 elapses. At this moment, the continuous image capturing velocity S is changed to 6 fps assigned to the area A2, and image capturing of an (M+1)th frame is performed after the interval T2 elapses from the image capturing of the Mth frame. Further, assume that at a time t5 during image capturing of an (M+2)th frame, the user moves the finger to the area A1. At this moment, the continuous image capturing velocity S is changed to 3 fps assigned to the area A1, and image capturing of an (M+3)th frame is performed after the interval T1 elapses from the image capturing of the (M+2)th frame. Assume that at a time t6 during the interval following the image capturing of the (M+3)th frame, the user releases the touch from the touch bar 29. In a case where the touch is thus released from the touch bar 29, the continuous image capturing velocity S immediately before the release of the touch is maintained. Therefore, for the (M+3)th frame and subsequent frames, the continuous image capturing continues at the continuous image capturing velocity S=3 fps until the touch bar 29 is touched again. Touching only when the user desires to change the continuous image capturing velocity allows the user to continue the image capturing at a desired continuous image capturing velocity even if the touch is released afterward.

Next, a use case of the case where the continuous image capturing velocity is changed will be described with reference to FIGS. 6A to 6D. FIGS. 6A to 6D illustrate image capturing of an approaching train, as an example. In a case where the user desires to capture an image at the timing when the train, which is a main object, comes forward, the user starts the continuous image capturing by pressing the shutter button 61 before the train comes. At a time t1, the train is still far off and looks small, and thus the continuous image capturing may not be performed at high velocity (FIG. 6A). Therefore, the user performs the continuous image capturing at 3 fps, by touching the area A1 of the touch bar 29. Afterward, at a time t2 when the train approaches, the user moves the finger on the area A1 of the touch bar 29 to the area A2, thereby increasing the continuous image capturing velocity to 6 fps (FIG. 6B). Subsequently, at a time t3 when the user desires to capture as many images as possible, the user moves the finger to the area A3, thereby increasing the continuous image capturing velocity to 10 fps (FIG. 6C). At a time t4 when the train has passed front of the user, the user returns the finger to the area A2, thereby decreasing the continuous image capturing velocity to 6 fps (FIG. 6D). The user can thus change the continuous image capturing velocity. Therefore, in a case where an object is far off and a change in the object is small, the continuous image capturing velocity is decreased to avoid excessive image capturing. As in a case where image capturing for a passing train is performed, in many cases, the continuous image capturing is performed for capturing the same object. If the user performs an operation for changing the velocity by opening the menu screen in the middle of the image capturing, the user cannot perform the image capturing while performing such an operation. However, according to this use case, the user only needs to change the touch area during the continuous image capturing and therefore, the user can continue the image capturing for the same object, without stopping the continuous image capturing.

Figure 7A:
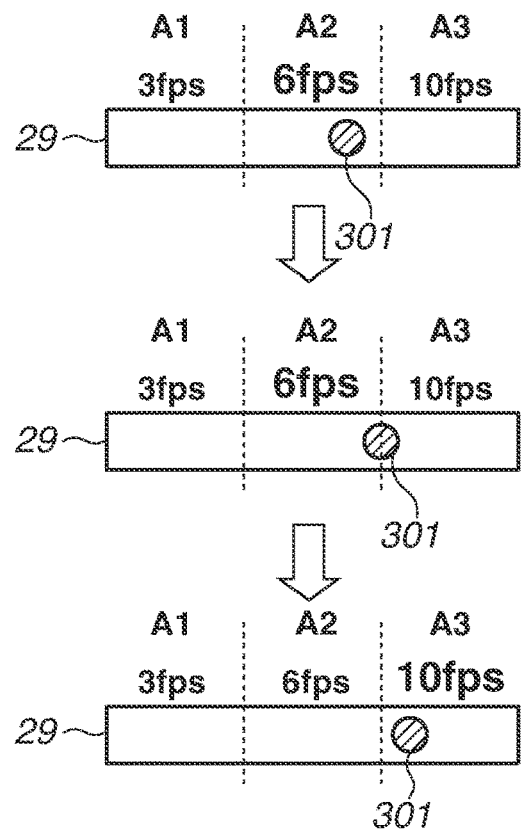
FIGS. 7A and 7B illustrate how to decide a continuous image capturing velocity according to the present exemplary embodiment.
Figure 7B:
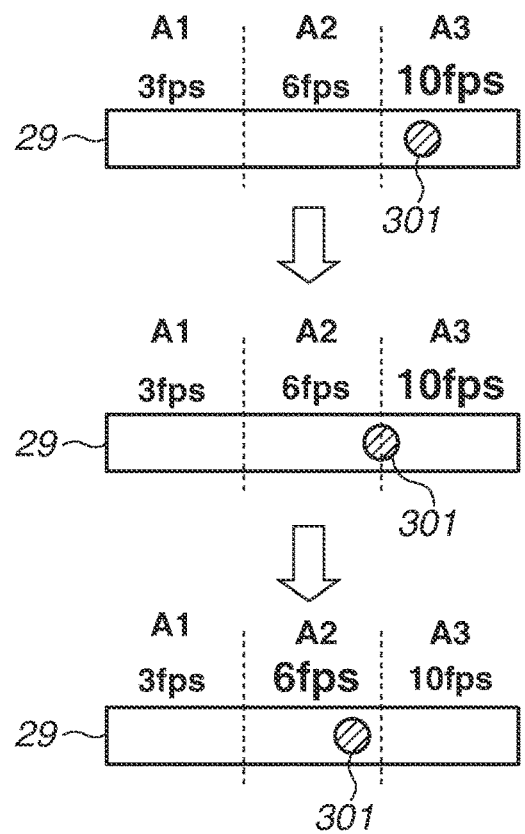

Next, how to decide the continuous image capturing velocity in moving from one touch area to another will be described with reference to FIGS. 7A and 7B. When a finger is moved on the touch bar 29, in a case where the touch position detected on the touch bar 29 is present between two areas, the continuous image capturing velocity S immediately before is maintained. FIG. 7A illustrates an operation for moving the finger from left to right (from the area A2 to the area A3), thereby increasing the continuous image capturing velocity S. FIG. 7B illustrates an operation for moving the finger from right to left (from the area A3 to the area A2), thereby decreasing the continuous image capturing velocity S. In FIG. 7A, when a touch point 301 is present between the areas A2 and A3, the continuous image capturing velocity S=6 fps of the area A2 where the touch point 301 was present immediately before is maintained. The continuous image capturing velocity S is then changed to 10 fps at a stage when the touch point 301 completely enters the area A3. In FIG. 7B, when the touch point 301 is present between the areas A2 and A3, the continuous image capturing velocity S=10 fps of the area A3 where the touch point 301 was present immediately before is maintained. The continuous image capturing velocity S is then changed to 6 fps at a stage when the touch point 301 completely enters the area A2.

In a case where two touch areas are both touched, the continuous image capturing velocity S immediately before is maintained and thus, the continuous image capturing velocity S is not unintentionally changed. For example, in a state where a position close to the area A3 in the area A2 is touched by the user with a finger, no change occurs in the continuous image capturing velocity, even when the finger is caused to also touch an adjacent area because the touch range is changed by, for example, bringing the touched finger from a standing state to a lying state. It is highly likely that the user believes that the user is touching the area A2. Therefore, even if the area A3 is touched, the continuous image capturing velocity is not changed. This allows the user to perform the image capturing as intended.

Figure 8:
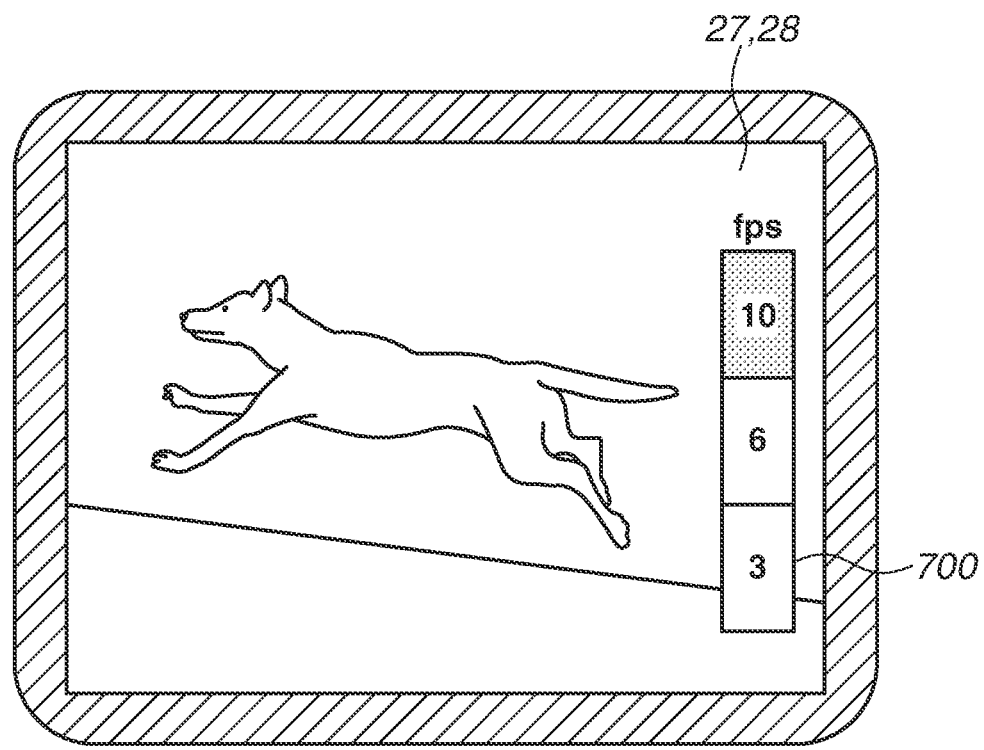
FIG. 8 illustrates a display example according to the present exemplary embodiment.

In the present exemplary embodiment, the touch bar 29 is used as a member for changing the continuous image capturing velocity S during the continuous image capturing. However, the member for changing the continuous image capturing velocity S is not limited to the touch bar 29 and may be any type of member as long as the member is a touch operation member. The touch panel 27 may also be used in place of the touch bar 29. FIG. 8 illustrates an example of a case where the continuous image capturing velocity S is changed using the touch panel 27. As illustrated in FIG. 8, a bar 700 is displayed on the display unit 28 integral with the touch panel 27. In the bar 700, the continuous image capturing velocities S are assigned to portions that the user can operate while pressing the shutter button 61, with another finger. In a manner similar to the operation on the touch bar 29, the continuous image capturing velocity S may be changed according to which area of the bar 700 displayed during the continuous image capturing is touched.

As described above, according to the above-described exemplary embodiment, the user can change the interval of the continuous image capturing during the continuous image capturing, with good operability. In the continuous image capturing, for an image capturing period during which the touch bar 29 is not touched, the image capturing is performed at the maximum velocity among the set continuous image capturing velocities, whereas for an image capturing period during which the touch bar 29 is touched, the interval for the continuous image capturing is decided according to the touch position of the touch bar 29. Hence, in a case where the touch bar 29 is not touched by the user, unintended failure to record an image is prevented, while excessive image capturing is prevented when the touch bar 29 is touched. The user can decide the interval of the continuous image capturing according to the state of an object with good operability and can perform image capturing with flexibility during the continuous image capturing.

As described above in the above-described exemplary embodiment, in a case where the continuous image capturing velocity S is changed, the interval T is changed according to the set continuous image capturing velocity S, whereby the time interval for image capturing is changed.

Figure 9:
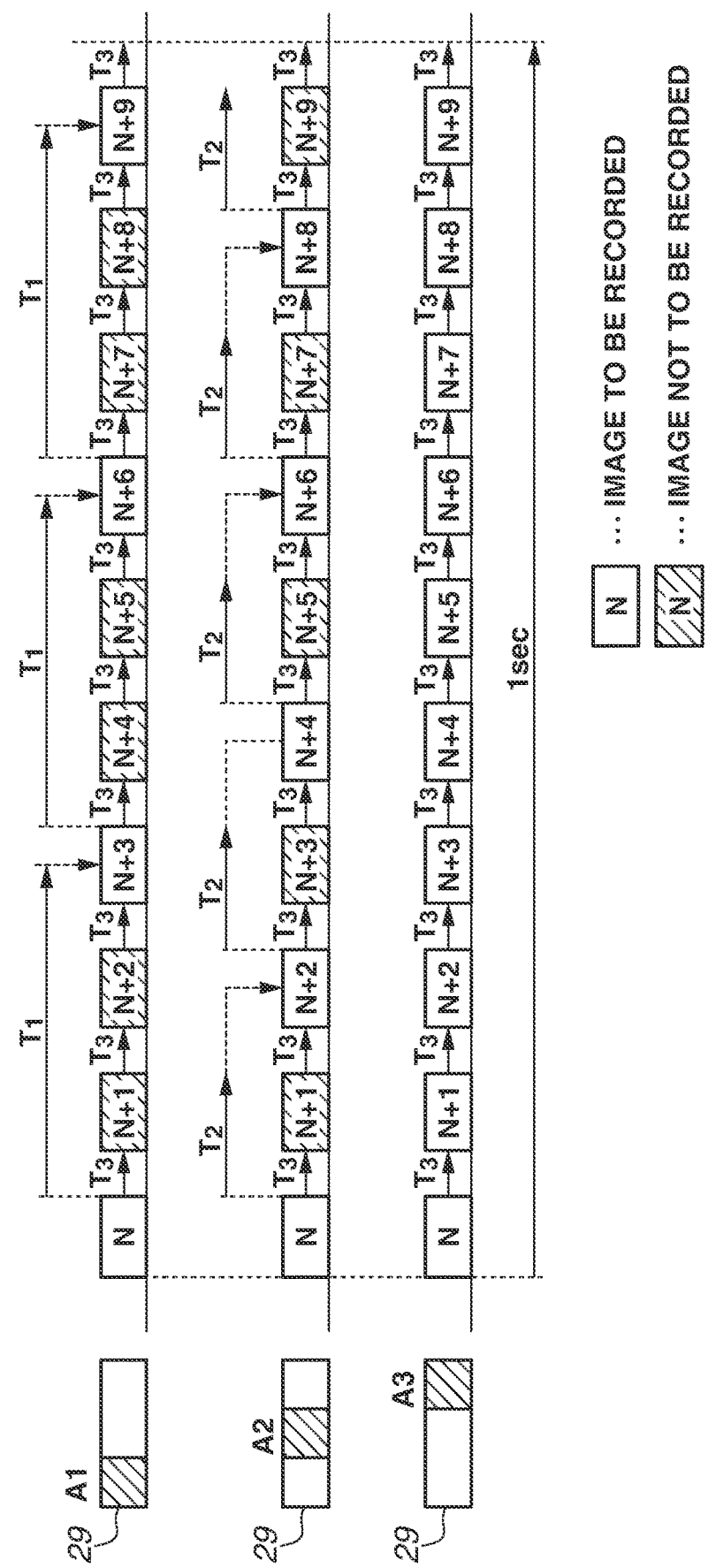
FIG. 9 illustrates a modification of the present exemplary embodiment.

Alternatively, instead of changing the image capturing interval, it is also possible to attach a flag to an image captured at the time when the interval according to the continuous image capturing velocity S has elapsed, and keep only the image with the flag among images recorded in the recording medium 200 after the image capturing, deleting the rest of the images. Alternatively, only the image with the flag may be stored from the memory 32 into the recording medium 200, and an image with no flag may be deleted. Only the image with the flag may be saved from the recording medium 200 into an external media. FIG. 9 illustrates a relationship between the continuous image capturing velocity and the flag. In a modification, the image capturing is performed while the shutter button 61 is pressed with S=$\alpha$ (the interval T3) set in the menu screen (or the initial setting). This interval is not changed in setting of any of the continuous image capturing velocities S. In a case where the continuous image capturing velocity S is changed with the touch bar 29, the flag is attached to an image at an interval corresponding to the value of this change. Flag is attached to the first image captured after the interval T1, in a case where the area A1 is touched, or after the interval T2, in a case where the area A2 is touched, elapses from an image capturing, and this image is recorded into the recording medium 200. In the example illustrated in FIG. 9, in a case where the area A1 is touched, the flag is attached to an (N+3)th image after the interval T1 elapses from an Nth image, to an (N+6)th image after the interval T1 further elapses, and to an (N+9)th image after the interval T1 further elapses. In a case where the area A2 is touched, the flag is attached to an (N+2)th image that is a first image after the interval T2 elapses from the Nth image. Subsequently, the flag is similarly attached to an (N+4)th image, an (N+6)th image, and an (N+8)th image, and these images are each recorded. In this way, when the continuous image capturing velocity S is changed, the actual image capturing velocity is not changed, but images are thinned out at the interval corresponding to the continuous image capturing velocity S (some of the images are recorded). The interval for recording captured images may be thus changed.

The continuous image capturing velocity has been described to be decreased according to the touch to the touch bar 29, but it may be increased instead.

The various kinds of control described above to be performed by the system control unit 50 may be performed by a single piece of hardware, or a plurality of pieces of hardware may share the processing to control the entire apparatus.

The present invention is described in detail based on some suitable exemplary embodiments, but the present invention is not limited to these specific exemplary embodiments and includes various forms in a range not deviating from the gist of the present invention. Further, the above-described exemplary embodiments each only represents an example of the present invention, and may be combined as appropriate.

Furthermore, in the exemplary embodiment described above, the case where the present invention is applied to the digital camera 100 is described as an example. However, the present invention is not limited to this case and is applicable to any type of imaging control apparatus if the apparatus can control continuous image capturing. In other words, the present invention is applicable to apparatuses including a mobile phone terminal, a portable image viewer, a printer apparatus with a viewfinder, a digital photo frame, a music player, a game console, and an electronic-book reader.

According to the present exemplary embodiment, operability in performing continuous image capturing can be improved.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-215914, filed Nov. 8, 2017, which is hereby incorporated by reference herein in its entirety.

What is claimed is:

1. An imaging control apparatus comprising at least one memory and at least one processor which function as:
   an instruction providing unit configured to be capable of providing an instruction for continuous image capturing in response to an operation on a first operation member;
   a touch detector configured to be capable of detecting a touch operation on a second operation member; and
   a control unit configured to perform control for recording images captured at an interval that varies, between a first continuous image capturing in a first image capturing period in a case where the second operation member is not being touched, and a second continuous image capturing in a second image capturing period which is different from the first image capturing period in a case where the second operation member is being touched, during the continuous image capturing that begins in response to the operation on the first operation member,
   wherein the second operation member includes a first area and a second area, and the control is performed for recording images captured at a first interval in a case where the first area is touched, and for recording images captured at a second interval in a case where the second area is touched.

2. The imaging control apparatus according to claim 1, wherein the control is performed for performing the continuous image capturing in a period in which the first operation member is operated.

3. The imaging control apparatus according to claim 1, wherein the first interval and the second interval are each longer than an interval of the continuous image capturing in the first image capturing period.

4. The imaging control apparatus according to claim 3, wherein the second interval is longer than the first interval.

5. The imaging control apparatus according to claim 4, wherein the control is performed for recording the images captured at the first interval of the first continuous image capturing in the first image capturing period, in a case where a third area of the second operation member is touched.

6. The imaging control apparatus according to claim 5, wherein the first area, the second area, and the third area are arranged in order of the first area, the second area, and the third area, in the second operation member.

7. The imaging control apparatus according to claim 1, wherein the control is performed for not changing the interval for image capturing in the continuous image capturing, even when a touch to the second operation member is released.

8. The imaging control apparatus according to claim 1, wherein the control is performed for performing image capturing in response to a transition from a state where the first area is touched to a state where the second area is touched, while image capturing is performed at the first interval, even when the first interval has not elapsed from immediately preceding image capturing.

9. The imaging control apparatus according to claim 1, wherein the control is performed for performing image capturing at the first interval in a state where the first area is touched and the second area is not touched, and for performing image capturing at the first interval, even when a transition occurs from the state where the first area is touched and the second area is not touched to a state where the first area and the second area are touched.

10. The imaging control apparatus according to claim 1, wherein the control is performed to acquire images captured at the interval of the continuous image capturing in the first image capturing period, and
    wherein the control is performed for recording the captured images in the first image capturing period, and for recording some of the captured images in the second image capturing period.

11. The imaging control apparatus according to claim 1, further comprising:
    an image sensor; and
    a viewfinder,
    wherein the first operation member is provided at a position that allows a user to operate the first operation member with a forefinger of a hand holding a grip portion, and
    wherein the second operation member is provided at a location that allows the user to perform the touch operation on the second operation member by using a thumb of the hand holding the grip portion while looking through the viewfinder.

12. The imaging control apparatus according to claim 11, wherein, on a back face of the imaging control apparatus opposite to a face in a direction for imaging by the image sensor, the second operation member is provided at a position toward a first direction with respect to the viewfinder and toward a second direction opposite to the first direction with respect to the grip portion, and at a position toward a third direction with respect to the center of the back face of the imaging control apparatus, in a direction perpendicular to the first direction.

13. The imaging control apparatus according to claim 12, further comprising a display configured to display an image obtained by the image sensor,
   wherein the second operation member is a device different from the display and is disposed at a position higher than the display on the back face.

14. The imaging control apparatus according to claim 1, wherein the first operation member is a shutter button.

15. A control method for an imaging control apparatus, the control method comprising:
   providing an instruction for continuous image capturing in response to an operation on a first operation member;
   detecting a touch operation on a second operation member; and
   performing control for recording images captured at an interval that varies, between a first continuous image capturing in a first image capturing period in a case where the second operation member is not being touched, and a second continuous image capturing in a second image capturing period which is different from the first image capturing period in a case where the second operation member is being touched, during the continuous image capturing that begins in response to the operation on the first operation member,
   wherein the second operation member includes a first area and a second area, and the performing control for recording images captured at a first interval in a case where the first area is touched, and for recording images captured at a second interval in a case where the second area is touched.

16. A computer readable non-transitory recording medium storing a program for causing a computer to function as each of units of the imaging control apparatus according to claim 1.

* * * * *